(12) United States Patent
Szentmihalyi et al.

(10) Patent No.: US 8,419,554 B2
(45) Date of Patent: Apr. 16, 2013

(54) CAGE FOR BALL JOINT AND BALL JOINT

(75) Inventors: Volker Szentmihalyi, Gutach (DE); Arne Schmidbauer, Gutach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 13/601,268

(22) Filed: Aug. 31, 2012

(65) Prior Publication Data
US 2012/0329565 A1 Dec. 27, 2012

Related U.S. Application Data

(63) Continuation of application No. PCT/DE2011/000201, filed on Feb. 26, 2011.

(30) Foreign Application Priority Data

Mar. 6, 2010 (DE) .......................... 10 2010 010 487

(51) Int. Cl.
*F16D 3/223* (2011.01)

(52) U.S. Cl.
USPC .......................................... 464/145; 464/906

(58) Field of Classification Search .......... 464/144–146, 464/906; 29/898.067; 384/523, 528, 533
See application file for complete search history.

(56) References Cited

U.S. PATENT DOCUMENTS

| 3,815,381 | A | 6/1974 | Wagner |
| 4,846,764 | A | 7/1989 | Hazebrook et al. |
| 4,995,853 | A | 2/1991 | Schwaerzler et al. |
| 6,241,615 | B1 | 6/2001 | Jacob |
| 6,461,244 | B2 | 10/2002 | Meyer et al. |
| 7,393,284 | B2 | 7/2008 | Hassenrik et al. |
| 7,507,160 | B2 * | 3/2009 | Maucher et al. ............... 464/145 |
| 7,604,545 | B2 * | 10/2009 | Jacob ............................. 464/145 |
| 7,648,418 | B2 | 1/2010 | Harnischfeger |
| 2007/0259724 | A1 | 11/2007 | Pohl |
| 2007/0298167 | A1 | 12/2007 | Ho et al. |

FOREIGN PATENT DOCUMENTS

| AU | 2002-352039 A1 | 6/2003 |
| DE | 1 202 588 A | 10/1965 |
| DE | 28 16 255 A1 | 10/1979 |
| DE | 38 30 579 A1 | 3/1989 |
| DE | 38 19 528 C1 | 10/1989 |
| DE | 43 29 769 C1 | 1/1995 |

(Continued)

OTHER PUBLICATIONS

Corresponding International Search Report with English Translation dated Jun. 28, 2011 ( six (6) pages).

(Continued)

*Primary Examiner* — Gregory Binda
*Assistant Examiner* — Josh Skroupa
(74) *Attorney, Agent, or Firm* — Crowell & Moring LLP

(57) ABSTRACT

A cage for a ball joint, the cage being configured annularly about a longitudinal axis and having an inner surface and an outer surface, two edges delimiting the inner surface and the outer surface and a window, in which the inner surface surrounds an inner space of the cage and two webs laterally adjoin the window. One edge of the cage has an offset relative to the longitudinal axis in relation to one of the two webs at the height of the window. A ball joint with a corresponding cage is also disclosed.

5 Claims, 3 Drawing Sheets

FOREIGN PATENT DOCUMENTS

| | | |
|---|---|---|
| DE | 196 48 537 C1 | 7/1998 |
| DE | 198 31 011 C1 | 3/2000 |
| DE | 102 01 169 A1 | 8/2002 |
| DE | 101 48 297 A1 | 4/2003 |
| DE | 103 04 156 A1 | 8/2004 |
| DE | 103 37 918 A1 | 3/2005 |
| DE | 10 2006 020 711 A1 | 11/2007 |
| EP | 1 529 978 A1 | 5/2005 |
| FR | 1 446 417 A | 10/1966 |
| GB | 2 319 584 A | 5/1998 |
| JP | 1-250619 A | 10/1989 |
| JP | 2010043668 A * | 2/2010 |
| WO | WO 03/046397 A1 | 6/2003 |

OTHER PUBLICATIONS

German Search Report with English Translation dated Mar. 18, 2010 (nine (9) pages).

* cited by examiner

CAGE FOR BALL JOINT AND BALL JOINT

CROSS REFERENCE TO RELATED APPLICATIONS

This application is a continuation of international patent application no. PCT/DE2011/000201, filed Feb. 26, 2011 designating the United States of America, and published in German on Sep. 15, 2011 as WO 2011/110155, the entire disclosure of which is incorporated herein by reference. Priority is claimed based on Federal Republic of Germany patent application no. DE 10 2010 010 487.6, filed Mar. 6, 2010, the entire disclosure of which is likewise incorporated herein by reference.

BACKGROUND OF THE INVENTION

The invention relates to a cage for a ball joint, the cage being configured essentially annular about a longitudinal axis, said cage having an inner surface and an outer surface, two edges delimiting the inner surface and the outer surface, and at least one window, wherein the inner surface surrounds an inner space of the cage and two webs laterally adjoin the at least one window. The invention also relates to a ball joint.

Ball joints are used, for example, in drive trains of vehicles in order to transmit the torque of the engine to a wheel axle. The balls serve for force or torque transmission between an outer hub and an inner hub of the joint and a cage having windows holds the balls in a plane in order to permit bending of the joint.

Various embodiments of ball cages are known from the prior art. German unexamined application no. DE 1 202 588 discloses a sprung cage, the windows of which are each provided with a slit. A cage with windows of different lengths is described in U.S. Pat. No. 7,393,284 (=DE 103 04 156). A cage with windows, the sides of which have a pointed shape, is disclosed in German patent no. DE 43 29 769 C1. German patent no. DE 28 16 255 discloses a cage, the outer surface of which has a bevel which extends from the edge of the cage to a longitudinal side of a window. Mounting enlargements are provided between the windows of the cage disclosed in published Australian patent application no. AU 2002-352039 A1 (=WO 03/046397). U.S. Pat. No. 6,461,244 (=DE 102 01 169) discloses a cage which has a groove for reducing the periphery of the cage provided between two windows. A cage, the windows of which each accommodate two balls adjoining one another, is disclosed in U.S. Pat. No. 7,648,418 (=DE 103 37 918). US patent publication No. U.S. 2007/0298167 (=DE 10 2006 020 711) discloses a cage which is configured such that lateral edges of the windows have a greater wall thickness than the remainder of the cage. U.S. Pat. No. 6,241,615 (=DE 198 31 011) discloses a cage, the windows of which have reinforcing projections. U.S. Pat. No. 4,846,764 (=DE 38 30 579) describes a cage produced from two half cages made of sheet metal.

A problem of the prior art cages lies in the fact that the balls press against the borders of the windows and that, due to the high torques and relative movements or sliding movements of the balls and the high temperatures resulting therefrom, damage can be caused to the cages, particularly in the region of the window support surfaces. A solution belonging to the prior art consists in increasing the wall thicknesses of the windows. This is undertaken selectively, only in the region of the windows, in order not to increase the weight of the cages unnecessarily. However, the associated production method is complex and costly. In particular, it is mostly metal-removing methods that must be used which, due to the interrupted structures of the material, further reduce the strength of the cage.

SUMMARY OF THE INVENTION

It is therefore an object of the invention to provide a cage for a ball joint which provides good support for the balls and yet is economical to manufacture.

This and other objects are achieved in accordance with the present invention by providing a cage in which at least one section of at least one edge has an offset relative to the longitudinal axis in relation to at least one of the two webs at the height of the at least one window.

According to the invention, therefore, at least one side of the at least one window is situated more remotely from or nearer to the longitudinal axis than a web by a particular offset. The window is therefore made from part of each edge and the two webs. If a plurality of windows is present, the webs are each preferably arranged between two windows. The offset is preferably generated by forming techniques, i.e. not by metal removal.

One embodiment of the cage according to the invention provides that the at least one section of at least one edge at the height of the at least one window in relation to the longitudinal axis is arranged closer to the longitudinal axis than the at least one of the two webs. In this embodiment, the edge is pressed in toward the longitudinal axis.

Another embodiment of the cage according to the invention is characterized in that at least one of the edges forms a ball running surface at the height of the at least one window, and that the ball running surface and the at least one of the two webs have essentially the same wall thickness. The ball running surface is preferably arranged symmetrically about the central plane of the window and lies essentially within the offset of the edge relative to the web. In this embodiment the ball running surface, that is, the part of the offset edge which, in the mounted joint, forms the stop for the balls, has the same wall thickness as the web or as the two webs adjacent to the window and surrounding the window. The wall thickness, which is essentially the same, is produced by the deformation of the edge toward the longitudinal or joint axis, for example, by means of the forming techniques.

Another embodiment of the cage according to the invention provides that the cage has a greater wall thickness at least in the region of the offset, than in the region of the webs.

Another embodiment of the cage according to the invention provides that each edge has at least one section having an offset relative to the longitudinal axis in relation to at least one of the two webs. According to this embodiment, the window is, for example, symmetrically enclosed, wherein the edges have an outward elevation or an inward depression, for example, in the central region of the window.

Another embodiment of the cage according to the invention provides that the outer surface is configured at least partially spherical.

The invention also relates to a ball joint having at least one cage corresponding to one of the above embodiments.

BRIEF DESCRIPTION OF THE DRAWINGS

The invention will be described in further detail hereinafter with reference to illustrative embodiments shown in the accompanying drawing figures, in which.

DETAILED DESCRIPTION OF ILLUSTRATIVE EMBODIMENTS

Figure 1:
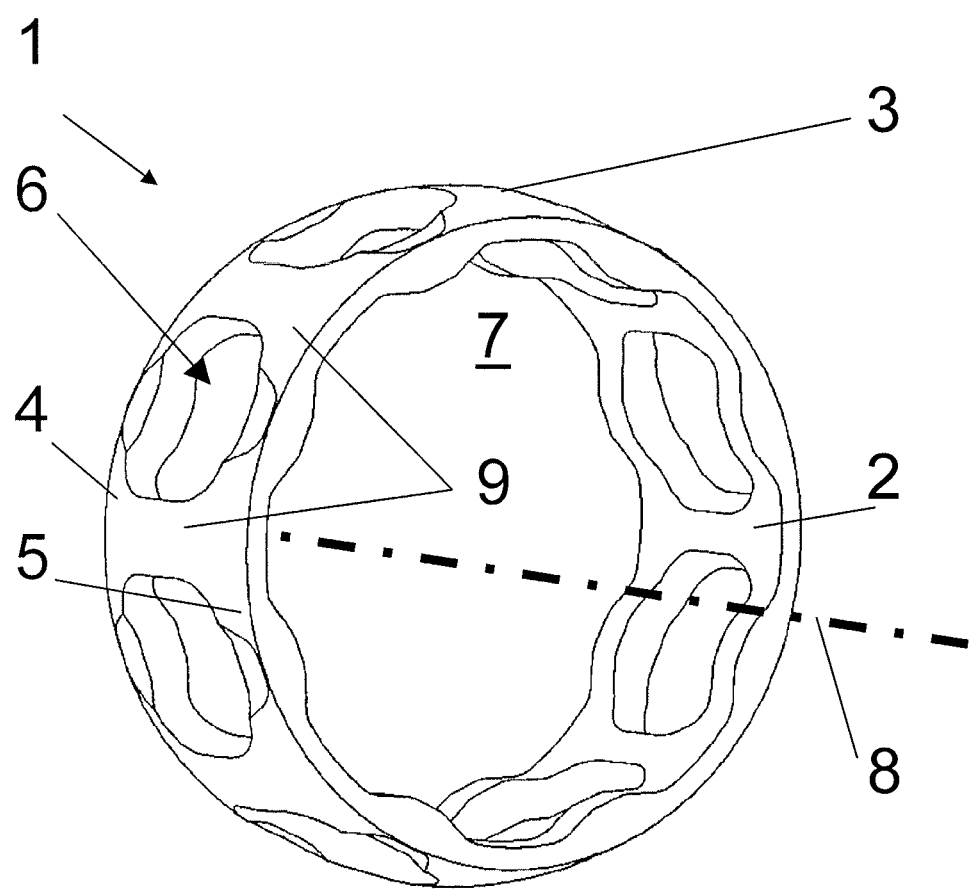
FIG. 1 is a perspective representation of a cage according to the invention.

FIG. 1 shows a cage 1 according to the invention which is configured circularly about a longitudinal axis 8. The outer surface 3 and the inner surface 2 surround an inner space 7. Windows 6 are provided which are surrounded by the edges 4, 5 and the webs 9 and which accommodate the balls when the ball joint is assembled. It is apparent that the edges 4, 5 offer a larger accommodating surface for the balls at the height of the windows 6 than in the region of the webs 9.

Figure 2:
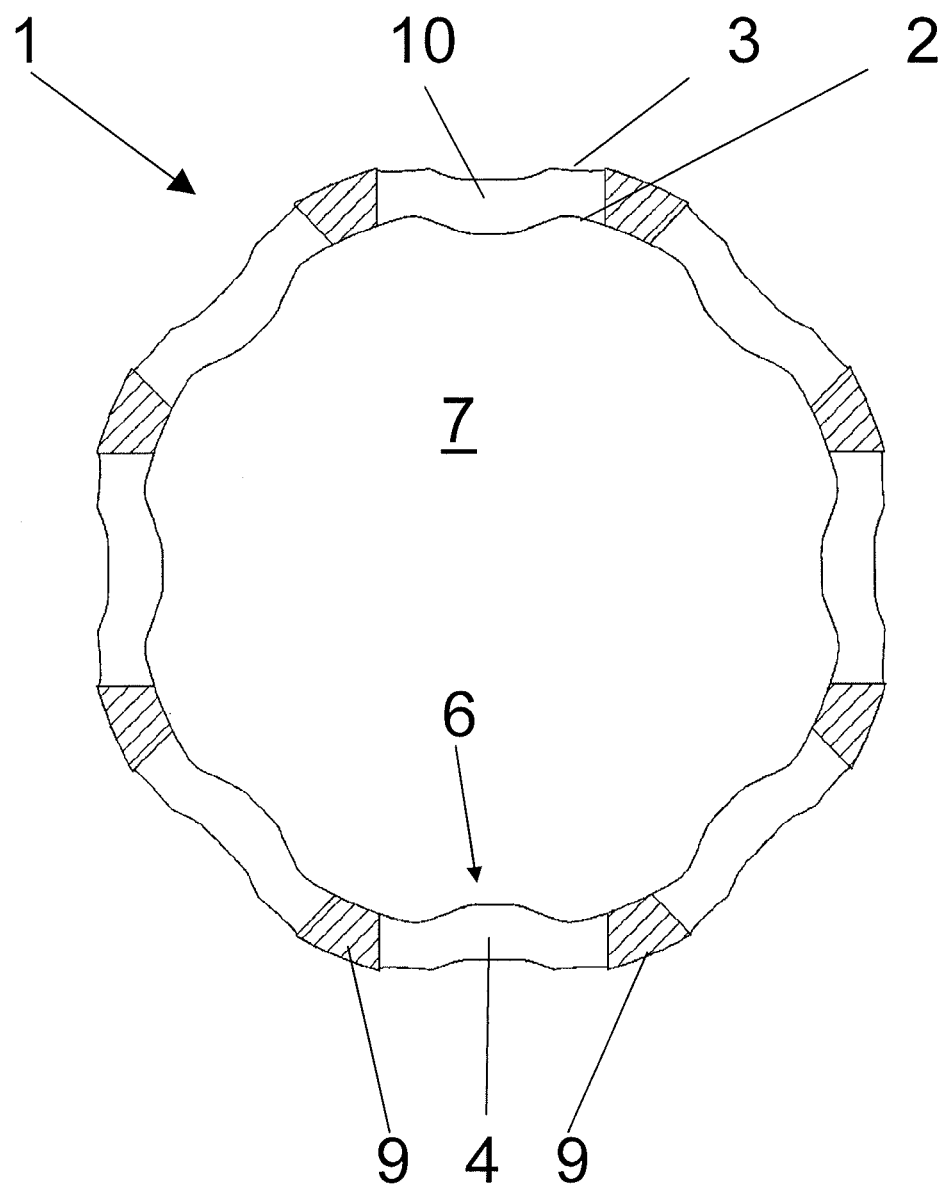
FIG. 2 is a section through the cage of FIG. 1.

The sectional view in FIG. 2 shows the offset in the edge 4 relative to the webs 9 toward the inner space 7.

A possible production method is, for example, the following: In a ring produced by any method, the cage windows 6 are initially stamped out. Subsequently, the central regions of the windows 6 are deformed radially inwardly, primarily over the whole cage height, such that the support surface is inwardly displaced throughout the material thickness. However, the sequence of stamping out the window and forming the central regions cannot be reversed. Thereafter, the outer sphere is produced as a guide surface in the joint outer part or the joint outer hub, for example, by metal removal. The guide surfaces are completely formed in the required region, that is, on both sides of the running paths of the joint outer part. Preferably, the cage according to the invention is used in an opposed path joint with external cage centering. One advantage lies in the economical production method for such cages with inward window reinforcement. In addition, the contact surfaces of the inner running paths can be configured larger, so that the transmission capacity of the joint is increased. Alternatively, it is possible to form the sphere surfaces by means of a stamping or rolling process, that is, without cutting. Preferably, a profiled mandril is placed in the bore as the support element. Any unevenness in the end faces of the cage which may occur due to uneven material displacement is not critical for function in some uses or such unevenness may be remedied by means of a simple turning process.

Figure 3:
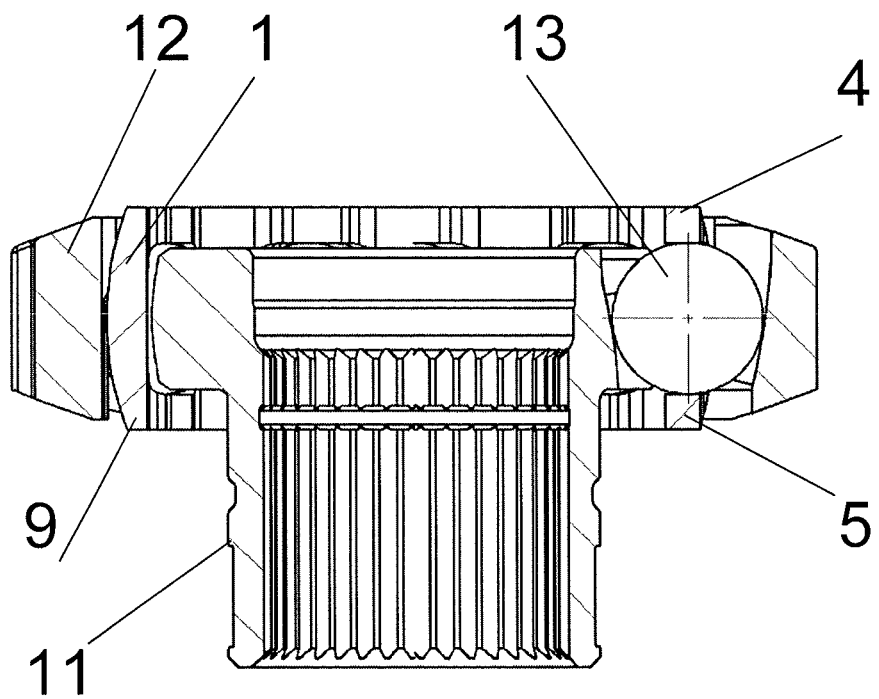
FIG. 3 is a section through a ball joint comprising the cage according to the invention.

FIG. 3 shows a joint with a cage 1 according to the invention. The section is so arranged as to pass through a portion of the cage 1 having a ball 13 and a portion without a ball, that is, at the height of a web 9. The inner hub 11 and the outer hub 12 each have grooves or paths for the balls 13 which transmit the torque between the two hubs 11, 12 of the joint. The balls 13 are held by the cage 1 in one plane, so that jamming following a bending movement of the joint is prevented.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A cage for a ball joint, said cage being configured essentially annularly about a longitudinal axis and having an inner surface, an outer surface, two edges delimiting the inner surface and the outer surface, and a plurality of windows, wherein
    the inner surface surrounds an inner space of the cage,
    two webs laterally adjoin each window of said plurality of windows,
    each edge of said two edges encloses each window of said plurality of windows symmetrically, and
    each edge of said two edges has for each window of said plurality of windows a section in a central region of the respective window with an offset being closer to the longitudinal axis than the two webs adjoining the respective window.

2. The cage as claimed in claim 1, wherein each edge of said two edges forms a ball running surface at a height of each window of said plurality of windows, and the ball running surfaces and the two webs adjoining the respective window have essentially the same wall thickness.

3. The cage as claimed in claim 1, wherein a wall thickness in the region of the offsets is greater than in the region of the webs.

4. The cage as claimed in claim 1, wherein the outer surface has an at least partially spherical configuration.

5. A ball joint comprising at least one cage as claimed in claim 1.

* * * * *